US007175289B2

(12) United States Patent
Lerner et al.

(10) Patent No.: US 7,175,289 B2
(45) Date of Patent: Feb. 13, 2007

(54) OPTICAL RELAY

(75) Inventors: Scott A. Lerner, Corvallis, OR (US);
Conor D. Kelly, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 329 days.

(21) Appl. No.: 10/941,332

(22) Filed: Sep. 15, 2004

(65) Prior Publication Data
US 2006/0055897 A1    Mar. 16, 2006

(51) Int. Cl.
G03B 21/28    (2006.01)
G02B 17/00    (2006.01)

(52) U.S. Cl. ......................................... 353/99; 359/365
(58) Field of Classification Search ................. 353/37, 353/98, 99; 359/364, 365
See application file for complete search history.

(56) References Cited

U.S. PATENT DOCUMENTS 4,293,186 A * 10/1981 Offner ......................... 359/366
5,140,459 A    8/1992 Sagan et al.
5,677,788 A * 10/1997 Chen et al. ................... 359/365
6,654,156 B1  11/2003 Crossland et al.
6,676,260 B2   1/2004 Cobb et al.
6,692,129 B2 *  2/2004 Gross et al. ................... 353/31
6,758,565 B1   7/2004 Cobb et al.

FOREIGN PATENT DOCUMENTS

| EP | 0 798 935 A | 10/1997 |
|----|-------------|---------|
| EP | 1 427 221 A | 6/2004 |
| WO | WO 2004/051363 A | 6/2004 |
| WO | WO 2004/051995 A | 6/2004 |

* cited by examiner

*Primary Examiner*—Christopher Mahoney

(57) ABSTRACT

An optical relay comprising a first mirror and a second mirror is provided. The first mirror is configured to receive modulated light from a first spatial light modulator and reflect the modulated light onto the second mirror. The second mirror is configured to reflect the modulated light onto the first mirror, and the first mirror is configured to reflect the modulated light onto a second spatial light modulator.

15 Claims, 2 Drawing Sheets

OPTICAL RELAY

BACKGROUND

A conventional system or device for displaying an image, such as a display, projector, or other imaging system, produces a displayed image by addressing an array of individual picture elements or pixels arranged in horizontal rows and vertical columns. A resolution of the displayed image is defined as the number of horizontal rows and vertical columns of individual pixels forming the displayed image. The resolution of the displayed image is affected by a resolution of the display device itself as well as a resolution of the image data processed by the display device and used to produce the displayed image.

Display devices may include a spatial light modulator that selectively transmits or reflects light from a light source to form an image. A spatial light modulator may be designed to either fully transmit or fully block light for each pixel of a display. In operation, however, spatial light modulators may not fully transmit light for pixels set to transmit light and may not fully block light for pixels set to block light. The amount of not fully transmitted light and not fully blocked light may be measure as the black white contrast of a display device.

It would be desirable to be able to enhance the black white contrast of a display device.

SUMMARY

One form of the present invention provides an optical relay comprising a first mirror and a second mirror. The first mirror is configured to receive modulated light from a first spatial light modulator and reflect the modulated light onto the second mirror. The second mirror is configured to reflect the modulated light onto the first mirror, and the first mirror is configured to reflect the modulated light onto a second spatial light modulator.

DETAILED DESCRIPTION

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
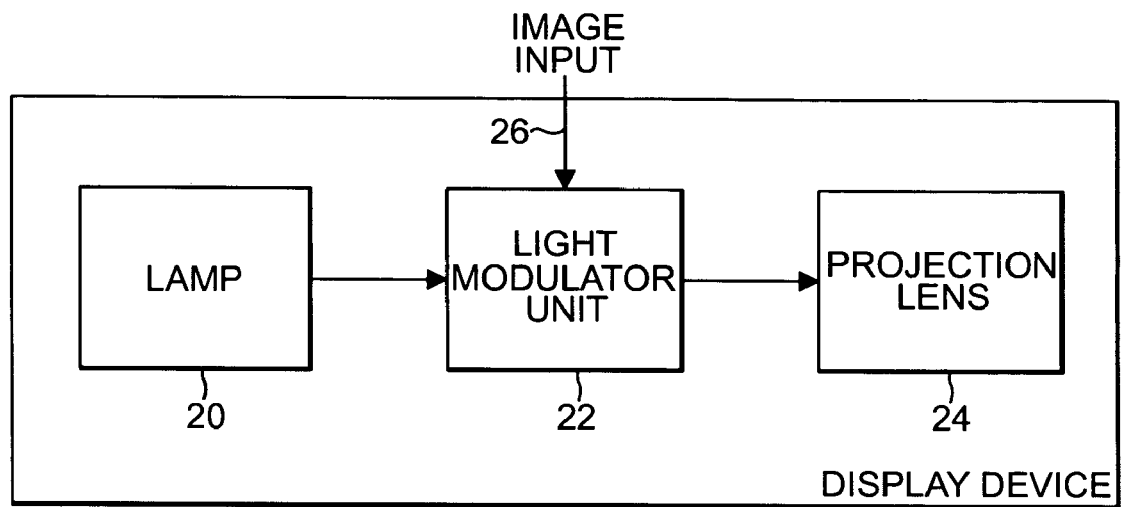
FIG. 1 is a block diagram illustrating a display device according to one embodiment of the present invention.

FIG. 1 is a block diagram illustrating one embodiment of a display device 10. Display device 10 comprises a lamp 20, a light modulator unit 22, and a lens 24. Light modulator unit 22 receives an image input signal 26.

Display device 10 receives image input signal 26 and causes images to be projected onto a screen or other surface in response to image input signal 26 using lamp 20, light modulator unit 22, and lens 24. More specifically, lamp 20 provides a polychromatic light source to light modulator unit 22. Light modulator unit 22 transmits or reflects selected portions of the light source through lens 24 in response to image input signal 26 to cause images to be projected onto a screen or other surface. Lamp 20 may be a mercury ultra high pressure, xenon, metal halide, or other suitable projector lamp.

Figure 2:
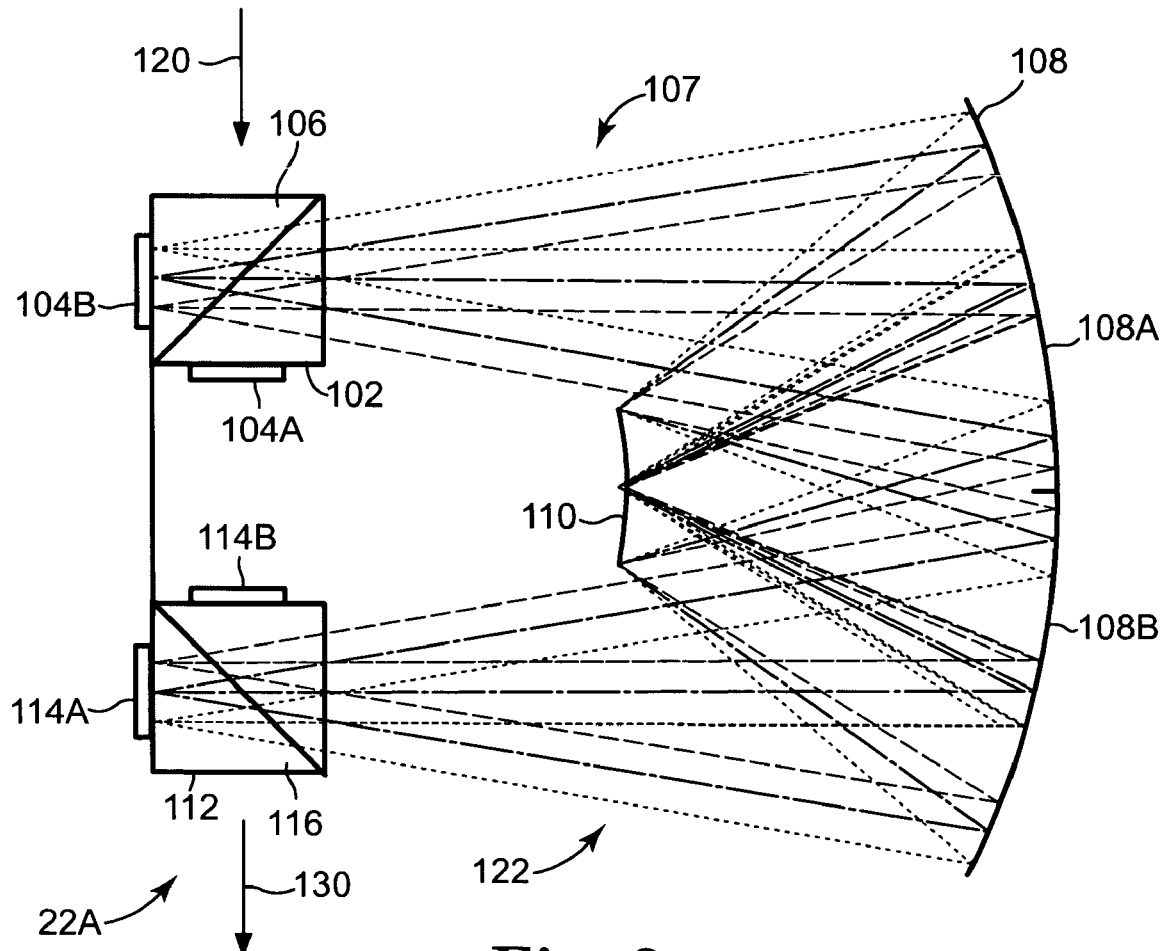
FIG. 2 is a schematic diagram illustrating a light modulator unit according to one embodiment of the present invention.
Figure 3:
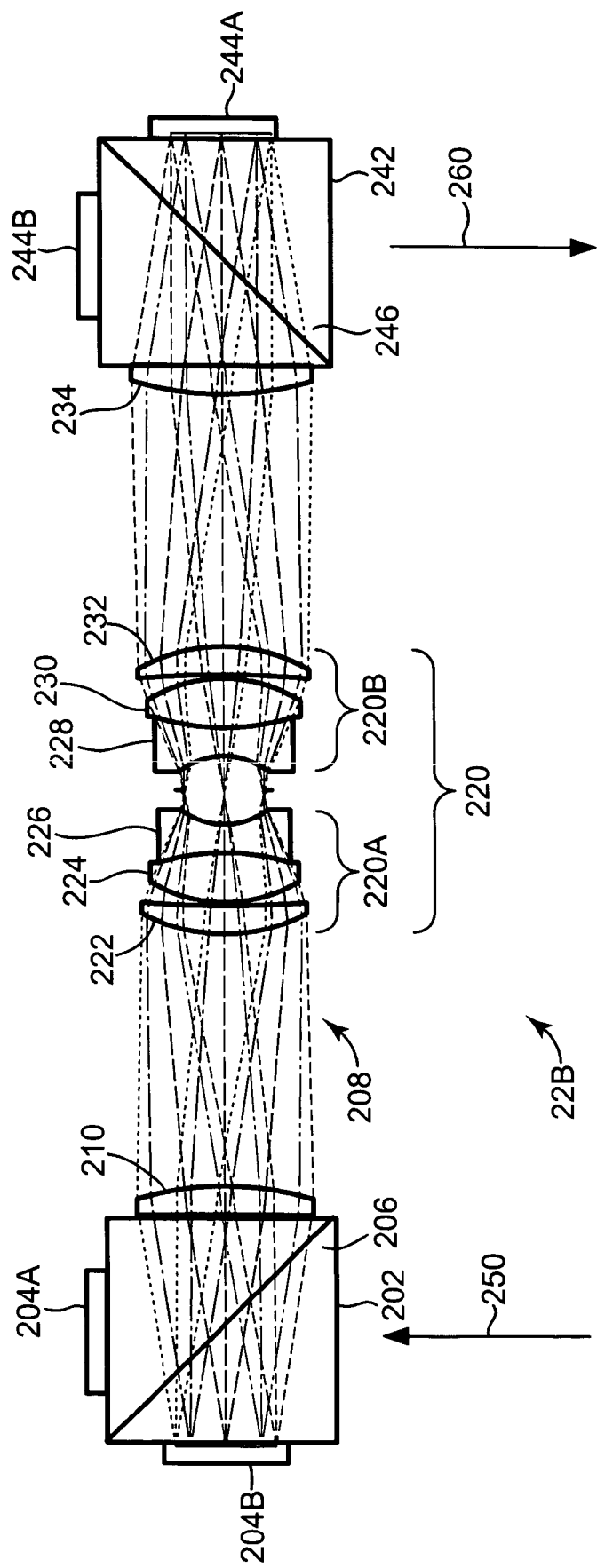
FIG. 3 is a schematic diagram illustrating a light modulator unit according to one embodiment of the present invention.

Light modulator unit 22 modulates light from lamp 20 using at least two spatial light modulators (shown in FIGS. 2 and 3). By doing so, light modulator unit 22 may improve the black white contrast of display device 10. Embodiments of light modulator unit 22 are shown as light modulator unit 22A in FIG. 2 and light modulator unit 22B in FIG. 3.

FIG. 2 is a schematic diagram illustrating one embodiment of a light modulator unit 22A. Light modulator unit 22A comprises a polarizing beamsplitting cube 102, spatial light modulators 104A and 104B, at least one quarter wave plate 106, mirrors 108 and 110, a polarizing beamsplitting cube 112, spatial light modulators 114A and 114B, and at least one quarter wave plate 116.

Light modulator unit 22A comprises one embodiment of an on-axis optical relay for display device 10. In particular, light modulator unit 22A comprises a modified Offner 1:1 optical relay with polarization components.

Light modulator unit 22A receives light from an illumination relay (not shown) as indicated by an arrow 120. Light modulator unit 22A separates and modulates the light using polarizing beamsplitting cube 102 and spatial light modulators 104A and 104B to generate modulated light 107. More particularly, polarizing beamsplitting cube 102 separates the light into two or more components, e.g., a red component and a blue-green component. One of the components is provided to spatial light modulator 104A where the light is modulated according to image information from image input signal 26. Modulated light 107 from spatial light modulator 104A is reflected off quarter wave plate 106 such that modulated light 107 is orthogonally polarized to the light incident on spatial light modulator 104A and is transmitted to mirror 108. The other component is reflected off quarter wave plate 106 onto spatial light modulator 104B where the light is modulated according to image information from image input signal 26. Spatial modulator 104B transmits this modulated light 107 to mirror 108 along with modulated light 107 from spatial light modulator 104A.

Light modulator unit 22A reflects modulated light 107 from spatial light modulators 104A and 104B onto spatial light modulators 114A and 114B using mirrors 108 and 110. In particular, modulated light 107 reflects off of a first portion 108A of mirror 108 onto mirror 110, reflects off of mirror 110 onto a second portion of mirror 108, and reflects off of the second portion 108B of mirror 108 onto spatial light modulators 114A and 114B as indicated by the lines of reflection 122 shown in FIG. 2. In the embodiment shown in FIG. 2, mirror 108 comprises a high order aspheric mirror and mirror 110 comprises a spherical mirror. In other embodiments, each portion 108A and 108B of mirror 108 may comprise a separate aspheric mirror.

Light modulator unit 22A separates and further modulates modulated light 107 from mirrors 108 and 110 using polarizing beamsplitting cube 112 and spatial light modulators 114A and 114B. More particularly, polarizing beamsplitting cube 112 separates the light into two or more components, e.g., a red component and a blue-green component. One of the components is provided to spatial light modulator 114A where the light is modulated according to image information from image input signal 26. The modulated light from spatial light modulator 114A is reflected off quarter wave plate 116 such that the modulated light is orthogonally polarized to the light incident on spatial light modulator 114A and is transmitted to projection lens 24 as indicated by an arrow 130. The other component is reflected off quarter wave plate 116 onto spatial light modulator 114B where the light is modulated according to image information from image input signal 26. Spatial modulator 114B transmits this modulated light to projection lens 24 along with the modulated light from spatial light modulator 114A as indicated by arrow 130.

In other embodiments, polarizing beamsplitting cubes 102 and/or 112 may be replaced with one or more polarizing plates. In addition, spatial light modulators 104A and 104B may be combined into a single spatial light modulator, or alternatively, additional spatial light modulators may be added to modulate other components of the light from the illumination relay. Similarly, spatial light modulators 114A and 114B may be combined into a single spatial light modulator, or alternatively, additional spatial light modulators may be added to modulate other components of the light from mirrors 108 and 110.

In other embodiments, mirror 108 may comprise any suitable spherical, conic, or anamorphic aspheric mirror or surface. Mirror 108 may also comprise two or more mirrors having the same or different magnification properties and configured to perform the functions described above. The mirrors may have front surface or back surface reflection. In addition, mirror 110 may comprise any suitable spherical, conic, or anamorphic aspheric mirror or surface with front surface or back surface reflection. Further, a dichronic mirror or additional lenses may be added to light modulator unit 22A to yield additional benefits in other embodiments.

FIG. 3 is a schematic diagram illustrating one embodiment of a light modulator unit 22B. Light modulator unit 22B comprises a polarizing beamsplitting cube 202, spatial light modulators 204A and 204B, at least one quarter wave plate 206, a lens 210, a lens module 220, a lens 234, a polarizing beamsplitting cube 242, spatial light modulators 2344A and 244B, and at least one quarter wave plate 246. Lens module 220 comprises a Double Gauss lens with a first portion 220A that includes lenses 222, 224, and 226 and a second portion 220B that includes lenses 228, 230, and 232.

Light modulator unit 22B comprises one embodiment of an on-axis optical relay for display device 10. In particular, light modulator unit 22B comprises a modified Double Gauss 1:1 optical relay with polarization components.

Light modulator unit 22B receives light from an illumination relay (not shown) as indicated by an arrow 250. Light modulator unit 22B separates and modulates the light using polarizing beamsplitting cube 202 and spatial light modulators 204A and 204B to generate modulated light 208. More particularly, polarizing beamsplitting cube 202 separates the light into two or more components, e.g., a red component and a blue-green component. One of the components is provided to spatial light modulator 204A where the light is modulated according to image information from image input signal 26. Modulated light 208 from spatial light modulator 204A is reflected off quarter wave plate 206 such that modulated light 208 is orthogonally polarized to the light incident on spatial light modulator 204A and is transmitted to lens 210. The other component is reflected off quarter wave plate 206 onto spatial light modulator 204B where the light is modulated according to image information from image input signal 26. Spatial modulator 204B transmits this modulated light 208 to lens 210 along with modulated light 208 from spatial light modulator 204A.

Light modulator unit 22B refracts modulated light 208 from spatial light modulators 204A and 204B onto spatial light modulators 244A and 244B using lens module 220 and lenses 210 and 234. In particular, lens 210 refracts modulated light 208 to cause the light to be transmitted to lens module 220 telecentrically. The first portion 220A of lens module 220 collimates modulated light 208 from lens 210 and transmits the light to the second portion 220B of lens module 220. The second portion 220B focuses the modulated light from the first portion 220A of lens module 220 and transmits the light to lens 234. Lens 234 refracts modulated light 208 from lens module 220 to cause the light to be transmitted to spatial light modulators 204A and 204B telecentrically.

Light modulator unit 22B separates and further modulates modulated light 208 from lens module 220 and lenses 210 and 234 using polarizing beamsplitting cube 242 and spatial light modulators 244A and 244B. More particularly, polarizing beamsplitting cube 242 separates the light into two or more components, e.g., a red component and a blue-green component. One of the components is provided to spatial light modulator 244A where the light is modulated according to image information from image input signal 26. The modulated light from spatial light modulator 244A is reflected off quarter wave plate 246 such that the modulated light is orthogonally polarized to the light incident on spatial light modulator 114A and is transmitted to projection lens 24 as indicated by an arrow 260. The other component is reflected off quarter wave plate 246 onto spatial light modulator 244B where the light is modulated according to image information from image input signal 26. Spatial modulator 244B transmits this modulated light to projection lens 24 along with the modulated light from spatial light modulator 244A as indicated by arrow 260.

In other embodiments, polarizing beamsplitting cubes 202 and/or 242 may be replaced with one or more polarizing plates. In addition, spatial light modulators 204A and 204B may be combined into a single spatial light modulator, or alternatively, additional spatial light modulators may be added to modulate other components of the light from the illumination relay. Similarly, spatial light modulators 244A and 244B may be combined into a single spatial light modulator, or alternatively, additional spatial light modulators may be added to modulate other components of the light from mirrors 108 and 110.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An optical relay comprising:
    a first mirror; and
    a second mirror;
    wherein the first mirror is configured to receive modulated light from a first spatial light modulator, wherein the first mirror is configured to reflect the modulated light onto the second mirror, wherein the second mirror is configured to reflect the modulated light onto the first mirror, and wherein the first mirror is configured to reflect the modulated light onto a second spatial light modulator.

2. The optical relay of claim 1 wherein the first mirror comprises a first portion and a second portion, wherein the first portion is configured to reflect the modulated light onto the second mirror, and wherein the second portion is configured to reflect the modulated light onto the second spatial light modulator.

3. The optical relay of claim 2 wherein the first portion comprises a first aspheric mirror, and wherein the second portion comprises a second aspheric mirror.

4. The optical relay of claim 1 wherein the first mirror is selected from the group consisting of a spherical mirror, a conic mirror, an aspheric mirror, and an anamorphic aspheric mirror.

5. The optical relay of claim 1 wherein the second mirror is selected from the group consisting of a spherical mirror, a conic mirror, an aspheric mirror, and an anamorphic aspheric mirror.

6. A system comprising:
    a first spatial light modulator configured to generate first modulated light in response to an image signal;
    a second spatial light modulator;
    first means for reflecting the first modulated light from the first spatial light modulator to form first reflected light;
    second means for reflecting the first reflected light from the first means to form second reflected light; and
    third means for reflecting the second reflected light onto the second spatial light modulator.

7. The system of claim 6 further comprising:
    a third spatial light modulator configured to generate second modulated light in response to the image signal; and
    a fourth spatial light modulator;
    wherein the first means is for reflecting the second modulated light from the third spatial light modulator to form third reflected light, wherein the second means is for reflecting the third reflected light from the first means to form fourth reflected light, and wherein the third means is for reflecting the fourth reflected light onto the fourth spatial light modulator.

8. The system of claim 7 further comprising:
    fourth means for polarizing unmodulated light from light source into a first component and a second component and for providing the first component to the first spatial light modulator and the second component to the third spatial light modulator; and
    fifth means for polarizing the second reflected light into a third component and the fourth reflected light into a fourth component and for providing the third component to the second spatial light modulator and the fourth component to the fourth spatial light modulator.

9. The system of claim 8 further comprising:
    a first quarter wave plate configured to reflect the first component onto the first spatial light modulator; and
    a second quarter wave plate configured to reflect the third component onto the second spatial light modulator.

10. The system of claim 9 wherein the first quarter wave plate is configured to reflect the second component onto the first means, and wherein the second quarter wave plate is configured to reflect the fourth component into a projection lens.

11. A display device comprising:
    a lamp configured to provide a light source;
    a light modulator unit configured to receive an input signal and comprising:
        a first spatial light modulator;
        a first mirror;
        a second mirror; and
        a second spatial light modulator; and
    a projection lens;
    wherein the first spatial light modulator is configured to generate first modulated light using the light source and the input signal, wherein the first spatial light modulator is configured to transmit the first modulated light to the first mirror, wherein the first mirror is configured to transmit the first modulated light to the second mirror, wherein the second mirror is configured to transmit the first modulated light back to the first mirror, wherein the first mirror is configured to transmit the first modulated light from the second mirror to the second spatial light modulator, wherein the second spatial light modulator is configured to generate second modulated light using the first modulated light and the input signal, wherein the second spatial light modulator is configured to transmit the second modulated light to the projection lens, and wherein the projection lens is configured to project an image associated with the input signal using the second modulated light.

12. The display device of claim 11 further comprising:
    a third spatial light modulator configured to generate third modulated light using the light source and the input signal; and
    a fourth spatial light modulator;
    wherein the third spatial light modulator is configured to transmit the third modulated light to the first mirror, wherein the first mirror is configured to transmit the third modulated light to the second mirror, wherein the second mirror is configured to transmit the third modulated light back to the first mirror, wherein the first mirror is configured to transmit the third modulated light from the second mirror to the second spatial light modulator, wherein the second spatial light modulator is configured to generate fourth modulated light using the third modulated light and the input signal, wherein the second spatial light modulator is configured to transmit the fourth modulated light to the projection lens, and wherein the projection lens is configured to project the image associated with the input signal using the second modulated light and the fourth modulated light.

13. The display device of claim 11 further comprising:
    a first polarizing beamsplitting cube configured to reflect first and second components of unmodulated light from the light source onto the first spatial light modulator; and
    a second polarizing beamsplitting cube configured to reflect first and second components of the first modulated light onto the second spatial light modulator.

14. The display device of claim 11 further comprising:

a first quarter wave plate configured to reflect unmodulated light from the light source onto the first spatial light modulator; and a second quarter wave plate configured to reflect the first modulated light onto the second spatial light modulator.

15. The display device of claim 11 further comprising:

a first quarter wave plate configured to reflect the first modulated light onto the first mirror; and a second quarter wave plate configured to reflect the second modulated light into the projection lens.

* * * * *